(12) United States Patent
Polydore

(10) Patent No.: US 12,123,804 B2
(45) Date of Patent: Oct. 22, 2024

(54) TOOL AND METHOD FOR ENDOSCOPIC INSPECTION OF A MANIFOLD CASING OF AN AIRCRAFT TURBINE ENGINE

(71) Applicant: SAFRAN AIRCRAFT ENGINES, Paris (FR)

(72) Inventor: Stéphane Polydore, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/285,808

(22) PCT Filed: Oct. 14, 2019

(86) PCT No.: PCT/FR2019/052428
§ 371 (c)(1),
(2) Date: Apr. 15, 2021

(87) PCT Pub. No.: WO2020/079354
PCT Pub. Date: Apr. 23, 2020

(65) Prior Publication Data
US 2021/0341358 A1 Nov. 4, 2021

(30) Foreign Application Priority Data
Oct. 18, 2018 (FR) ...................................... 1859651

(51) Int. Cl.
*G02B 23/24* (2006.01)
*G01M 15/14* (2006.01)
*G01N 21/954* (2006.01)

(52) U.S. Cl.
CPC ..... *G01M 15/14* (2013.01); *G01N 2021/9542* (2013.01); *G02B 23/2476* (2013.01)

(58) Field of Classification Search
CPC .................................................. G02B 23/2476
See application file for complete search history.

(56) References Cited

U.S. PATENT DOCUMENTS 4,298,312 A * 11/1981 MacKenzie ........... F01D 21/003
385/119
9,766,159 B2 * 9/2017 Konomura ......... G02B 23/2476
(Continued)

FOREIGN PATENT DOCUMENTS

EP 2818908 A1 12/2014
FR 2973110 A1 * 9/2012 ................ B23P 6/00
(Continued)

OTHER PUBLICATIONS

Title: Intelligent visual inspection of valve-stem seals; URL: https://www.sciencedirect.com/science/article/pii/096706619500122B (Year: 1995).*

(Continued)

*Primary Examiner* — Jill E Culler
*Assistant Examiner* — Ruben C Parco, Jr.
(74) *Attorney, Agent, or Firm* — CHRISTENSEN O'CONNOR JOHNSON KINDNESS PLLC

(57) ABSTRACT

A positioning tool for an endoscopic inspection means for inspecting a manifold casing of an aircraft turbine engine includes an annular wall with through holes. The annular wall is surrounded by an annular manifold having at least one gas port emerging in an annular recess delimited between the manifold and the wall. The tool further includes a centering device configured to be engaged in the port and having a distal end configured to bear against the wall, and a proximal end configured to be held securely on an opening of the port. At least one mask is configured to be engaged in the port and to be positioned and secured on the centering device. The mask comprising includes an endoscopic inspection window for inspecting a zone to be inspected inside the port and/or the recess.

14 Claims, 3 Drawing Sheets

(56) References Cited

U.S. PATENT DOCUMENTS

2005/0148287 A1* 7/2005 Moeller ............... F01D 25/243
    451/6
2017/0276616 A1 9/2017 Lee et al.

FOREIGN PATENT DOCUMENTS

| JP | 2007279416 A | * | 10/2007 | |
|---|---|---|---|---|
| JP | 5063967 B2 | * | 10/2012 | |
| WO | WO-2013069463 A1 | * | 5/2013 | ......... A61B 1/00096 |
| WO | 2013116078 A1 | | 8/2013 | |

OTHER PUBLICATIONS

International Search Report mailed Feb. 4, 2020, issued in corresponding International Application No. PCT/FR2019/052428, filed Oct. 14, 2019, 5 pages.

Written Opinion of the International Searching Authority mailed Feb. 4, 2020, issued in corresponding International Application No. PCT/FR2019/052428, filed Oct. 14, 2019, 6 pages.

Written Opinion mailed Feb. 4, 2020, issued in corresponding International Application No. PCT/FR2019/052428, filed Oct. 14, 2019, 6 pages.

International Preliminary Report on Patentability mailed Apr. 14, 2021, issued in corresponding International Application No. PCT/FR2019/052428, filed Oct. 14, 2019, 7 pages.

* cited by examiner

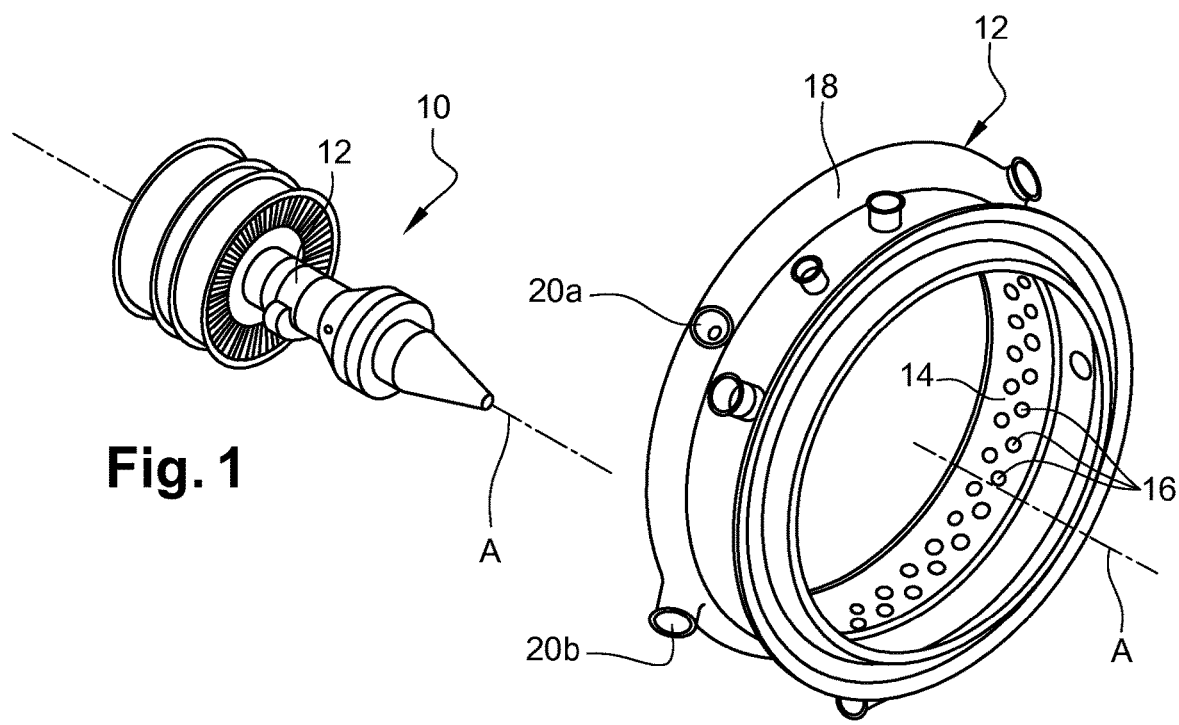
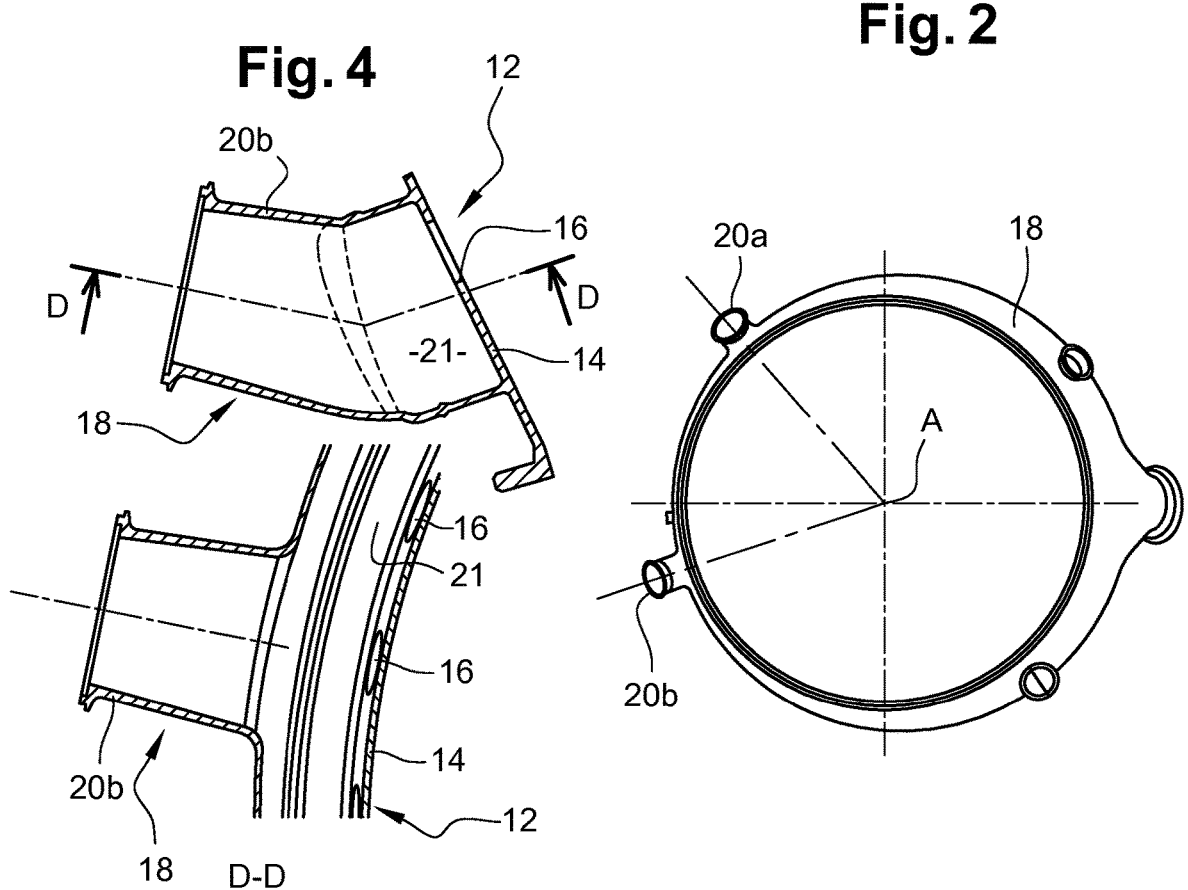

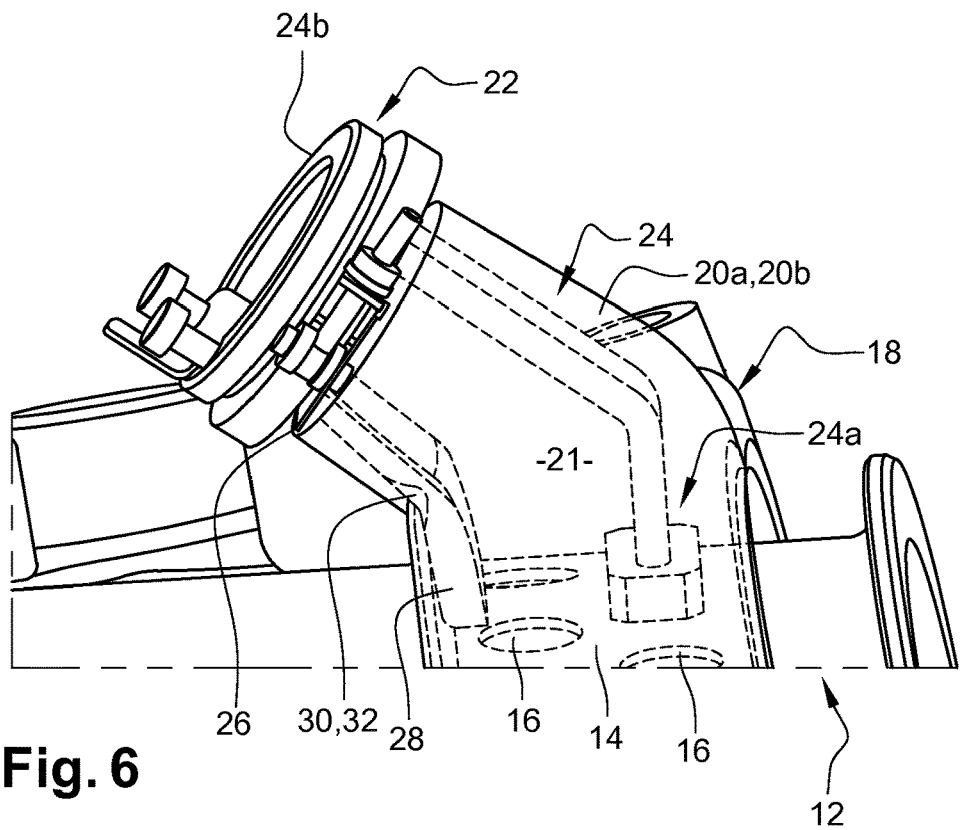
Fig. 6
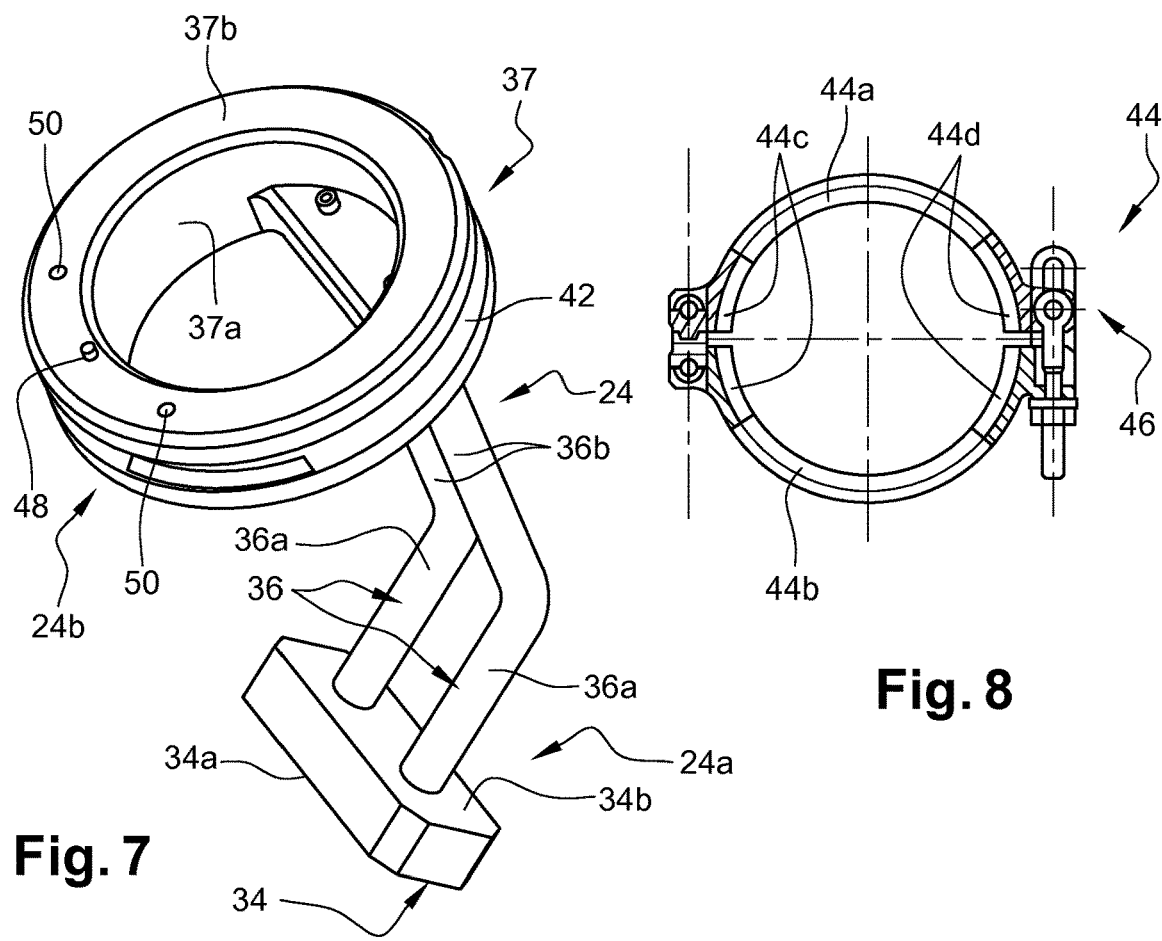
Fig. 7
Fig. 8

TOOL AND METHOD FOR ENDOSCOPIC INSPECTION OF A MANIFOLD CASING OF AN AIRCRAFT TURBINE ENGINE

TECHNICAL FIELD

The present disclosure relates to a tool and a method for endoscopic inspection of a manifold casing of an aircraft turbine engine.

BACKGROUND

The prior art comprises in particular the documents EP-A1-2 818 908, US-A1-2017/276616 and WO-A1-2013/116078.

Certain parts or modules of an aircraft turbine engine have a service life that is estimated in number of operating cycles and these parts or modules must be inspected regularly so as to check their condition. For example, a part may be inspected every 2000 operating cycles, and this is referred to as a 2000 cycle reinspection pitch.

A part can be inspected directly on the engine or after removal of the engine. It is clearly more advantageous and, above all, more economical to inspect a part directly on the engine and for this part to have the largest possible reinspection pitch. The inspection of an internal part directly on an engine is traditionally carried out by endoscopic inspection. The casings or equipment of the engine, for example, are inspected by other means (US, eddy current, visual, etc.).

FIG. 1 shows an aircraft turbine engine 10 and the position of a manifold casing 12 shown on a larger scale in FIG. 2 and in more detail in FIGS. 3 to 5.

This casing 12 is generally annular in shape and is generally located between the low pressure compressor and the high pressure compressor of the turbine engine 10. The casing 12 is used for the removal of compressed air for its delivery to other locations in the turbine engine. It comprises an annular wall 14 which comprises through orifices 16 and is surrounded by an annular manifold 18 comprising gas passages ports 20a, 20b opening into an annular cavity 21 defined between the manifold 18 and the wall 14. The ports 20a, 20b extend generally radially outwardly with respect to the axis A of revolution of the wall 14 and the casing 12, and may have inclined orientations with respect to radii to the axis A. The ports 20a, 20b may have different shapes and dimensions.

A manifold casing 12 of this type needs to be inspected and its critical parts comprise in particular the ports 20a, 20b, and in particular the junction between the ports 20a, 20b and the annular manifold 18. The endoscopic inspection of this casing is to be favoured to avoid a removal of the turbine engine. However, there is currently no tool dedicated to this inspection that would ensure an optimal and repeatable quality inspection.

SUMMARY

The present disclosure provides a solution to the above-mentioned need, which is simple, effective and economical.

The disclosed subject matter thus proposes a positioning tool for an endoscopic inspection means for inspecting a manifold casing of an aircraft turbine engine, this manifold casing comprising an annular wall with an axis A of revolution which comprises through orifices and which is surrounded by an annular manifold comprising at least one gas passage port opening into an annular cavity delimited between the manifold and said wall, characterised in that the tool comprises:
- a centering device configured to be engaged in said port and comprising a distal end configured to bear against said wall, and a proximal end configured to be held securely on an opening of said port, and
- at least one mask configured to be engaged in said port and to be positioned and fastened on said centering device, this mask comprising a window for endoscopic inspection of a zone to be inspected inside said port and/or said cavity.

The purpose of this tool is to allow an operator to reliably and repeatably locate a possible defect during an endoscopic inspection, in order to increase the reinspection pitch, because depending on the size and location of this defect, the engine can be removed more or less quickly in order to carry out a more thorough inspection during a workshop visit.

The tool according to the present disclosure may comprise one or more of the following characteristics and/or steps, taken in isolation from each other or in combination with each other:
- said centering device comprises at its distal end a bearing pad, preferably made of plastic material or aluminium,
- said centering device comprises at its proximal end a ring for fastening to the opening of the port,
- the pad and the ring are connected together by at least one rod, preferably bent,
- the tool comprises a collar for fastening the ring to the port opening,
- the ring comprises at least one surface for bearing against and positioning the mask,
- the ring comprises an internal cylindrical surface and a radial surface for bearing against and positioning the mask,
- the ring comprises at least one guide pin configured to cooperate with a hole or a slot of the mask,
- the mask carries elements for fastening to the centering device,
- the mask comprises a handle,
- the mask comprises at least one surface for bearing against the centering device,
- the mask comprises an external cylindrical surface and a radial surface for bearing against the centering device,
- the mask is formed by a stamped and pierced sheet metal of said window;
- alternatively, the mask is formed by additive manufacturing,
- the sheet metal is folded at the junction between a cylindrical portion and a flat portion, the window being located at least at this junction,
- the tool comprises at least two, and preferably three, masks, each of which is capable of being successively engaged in the port and which have windows of different dimensions and/or positions.

The present disclosure also relates to a method of endoscopic inspection of a manifold casing of an aircraft turbine engine, this manifold casing comprising an annular wall with an axis A of revolution which comprises through orifices and which is surrounded by an annular manifold comprising at least one gas passage port opening into an annular cavity delimited between the manifold and said wall, characterised in that it is implemented by means of a tool as described above and comprises the steps of:
- engaging the centering device of the tool in said port and bringing its distal end to bear against said wall, fastening the proximal end of the centering device to the opening of the port, engaging the mask in the port and fastening this mask on the centering device, and endoscopically inspecting said zone through the window of the mask, the method may further comprise the successive and possibly repeated steps of:

disassembling and removing the mask, engaging another mask in the port and fastening that other mask to the centering device, and endoscopically inspecting said zone through the window of said other mask.

The present disclosure also relates to a kit comprising the above-mentioned tool, namely a centering device and a mask, but also other masks and for example two other masks, the masks of the kit having windows of different dimensions and/or positions.

The present disclosure further relates to an endoscopic tool, comprising a positioning tool or a kit as described above, and an endoscopic inspection means.

DESCRIPTION OF FIGURES

The present disclosure will be better understood and other details, characteristics and advantages of the invention will become clearer from the following description, which is given by way of non-limiting example and with reference to the attached drawings wherein:

FIG. 1 is a schematic perspective view of an aircraft turbine engine, seen from downstream and from the side;

FIG. 2 is a schematic perspective view of a manifold casing of the turbine engine of FIG. 1;

FIG. 3 is another schematic perspective view of the manifold casing;

FIGS. 4 and 5 are cross-sectional views of the manifold casing;

FIG. 6 is a partial schematic perspective view of a manifold casing equipped with a tool according to the present disclosure;

FIG. 7 is a schematic perspective view of a centering device of the tool of FIG. 6;

FIG. 8 is a schematic perspective view of a fastening collar of the tool of FIG. 6;

DETAILED DESCRIPTION

Figures 9A, 9B, 9C:
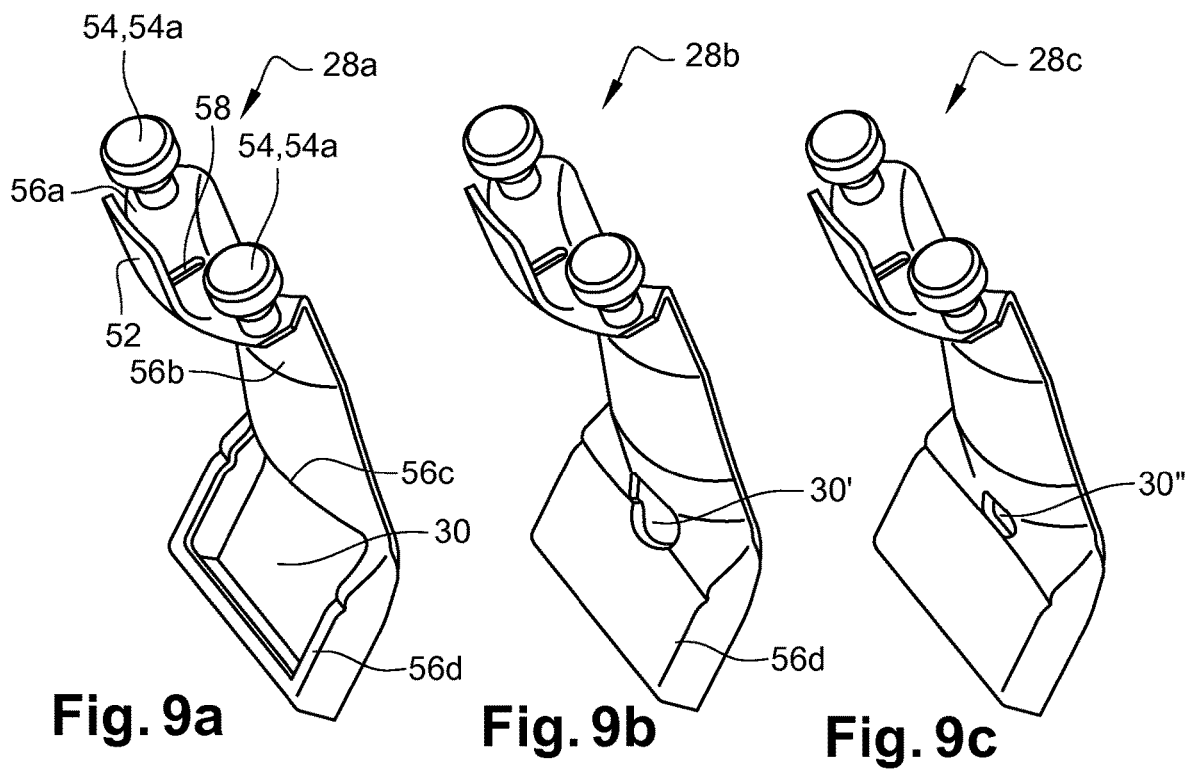
FIG. 9a is a schematic perspective view of a mask of the tool of FIG. 6.
FIGS. 9b and 9c are similar views to that of FIG. 9a and showing other masks which may belong to the same tool or kit.

FIGS. 1 to 5 have been described above.

Reference is now made to FIGS. 6 to 10 which represent an embodiment of a tool 22 according to the invention for endoscopic inspection of a manifold casing 12.

The tool 22 comprises:

a centering device 24 configured to be engaged in the port 20a, 20b to be inspected and comprising a distal end 24a configured to bear against the wall 14, and a proximal end 24b configured to be securely held on the radially external opening 26 of the port 20a, 20b, and at least one mask 28a, 28b, 28c configured to be engaged in the port 20a, 20b and to be positioned and fastened on the centering device 24, this mask comprising a window 30 for endoscopic inspection of a zone 32 to be inspected inside the port 20a, 20b and/or the cavity 21.

The centering device 24 is best seen in FIG. 7. Its distal end 24a comprises a pad 34 for bearing against the wall 14. In the example shown, this pad 34 has a generally substantially parallelepiped shape which comprises a flat or slightly concave curved lower surface 34a intended to bear against the wall 14 to facilitate the positioning of the centering device 24 in the port 20a, 20b. The pad 34 is preferably made of a plastic material so as not to damage the wall 14 and the port 20a, 20b when mounting the centering device 24, the casing 12 being generally made of a metal alloy.

The pad 34 comprises an upper surface 34b for connecting the pad to the proximal end of the centering device 24, this connection being made here by rods 36. The rods 36 are here two in number, although this number is not limiting. They have a generally elongated cylindrical shape and are also bent. The angled shape of the rods 36 enables to follow the shape and the orientation of the port 20a, 20b which is inclined with respect to a radius to the axis of revolution of the wall 14, as mentioned above. This is to allow easier passage of the endoscopic inspection means and the masks 28a, 28b, 28c. Each rod 36 thus comprises two longitudinal portions inclined with respect to each other, a first portion 36a extending from the pad 34 and its surface 34b radially outwards, according to a normal to the wall 14, and a second portion 36b extending between the radially outer end of the portion 36a and the proximal end 24b of the centering device 24. The portion 36a is located in the cavity 21 and the portion 36b is located in the port 20a, 20b.

The proximal end 24b of the centering device 24 comprises a ring 37 for fastening to the opening 26 of the port 20a. In the example shown, the opening 26 is generally annular in shape and comprises an outer peripheral rim 42 for bearing and fastening the ring 37, as is best seen in the cross-sectional view in FIG. 10.

In the illustrated example, the ring 37 comprises a cylindrical rim 38 directed towards the distal end 24a and intended to be slidably engaged in the opening 26 of the port 20a, 20b in order to centre the centering device 24 in this opening. The ring 37 further comprises an outer annular flange 40 which is applied to the peripheral rim 42 of the opening 26, in the direction of engagement of the centering device in the port, and is fastened to this rim by a fastening collar 44 shown alone in FIG. 8.

This fastening collar 44 is of a conventional type and comprises a hoop in two sectors 44a, 44b which are hinged at one of their ends 44c and are fastened at their other ends 44d by a screw and nut system 46. The clamping collar 44 is mounted around the rim 42 and the flange 40 and clamps them in the aforementioned direction.

As can be seen in FIG. 7, the ring 37 comprises an internal cylindrical surface 37a and a radial annular surface 37b located on the side opposite the distal end. "Radial" here refers to the axis of revolution of the ring 37. The surfaces 37a, 37b are connected to each other and the radial surface 37b comprises a protruding pin 48 for guiding the mask 28. The surface 37b further comprises threaded holes 50, here two in number and arranged on either side of the pin 48.

FIGS. 9a to 9c show masks 28a, 28b, 28c which can be used successively with the same centering device 24 described above. The following description with reference to the first mask 28a in FIG. 9a applies to masks 28b, 28c in FIGS. 9b and 9c.

In the example shown, the mask 28a is made from a stamped and folded sheet metal, although this is not limiting. The sheet metal may also be made by additive manufacturing. At its proximal end, the mask 28a comprises a tab or handle 52 for gripping and handling the mask. At this same end, the mask also comprises elements 54 for fastening to the centering device 24, of which there are two here and which are intended to cooperate with the holes 50 of the centering device. These fastening elements 54 may be screws captively mounted on the mask 28a, these screws having heads 54a accessible by an operator and which can ideally be driven manually by this operator without any specific tool.

Figure 10:
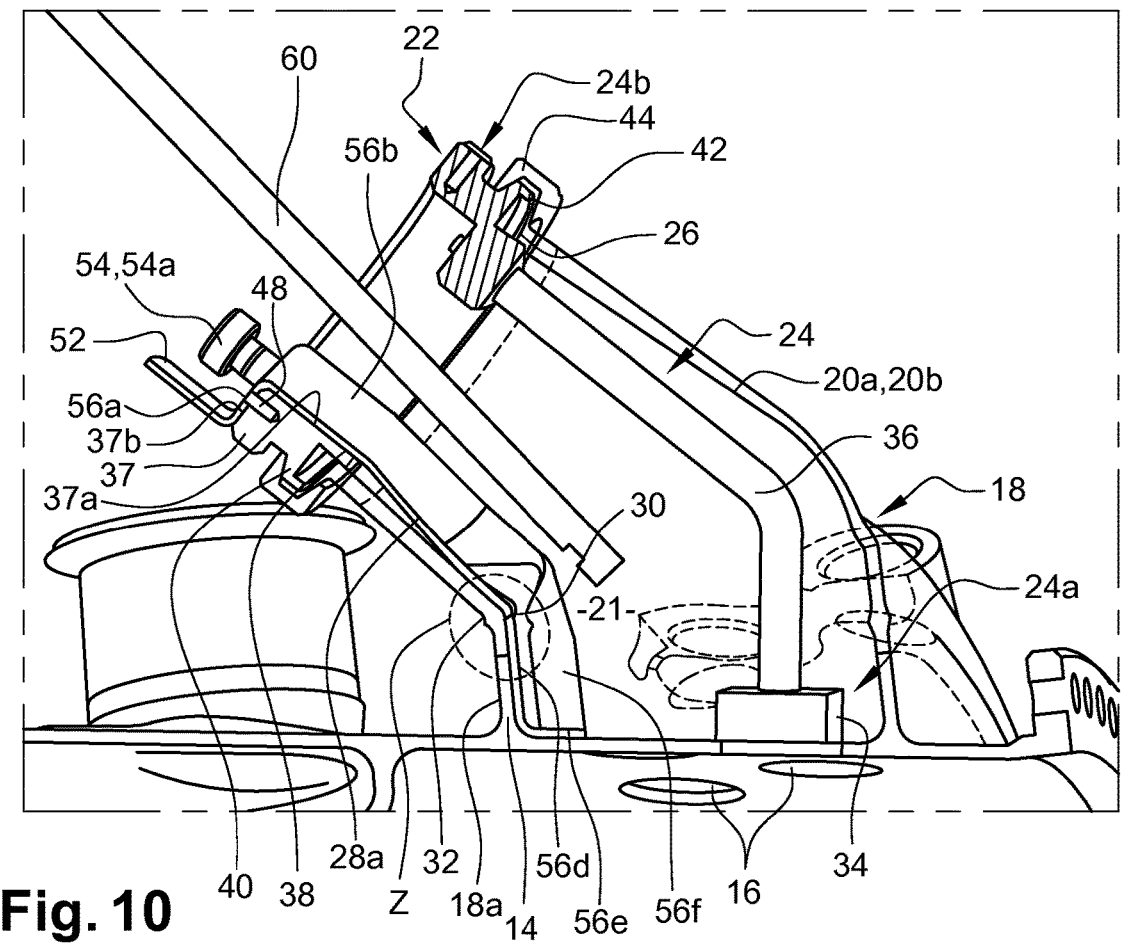
FIG. 10 is a view similar to that of FIG. 6 and shows an endoscopic inspection pitch of the manifold casing.

These fastening elements 54 are located on a flat wall 56a of the mask 28a which is intended to bear against the radial surface 37b and which comprises a slot 58 for engagement and sliding of the pin 48, as can be seen in FIG. 10. This flat wall 56a is connected to the handle 52 and to a cylindrical wall 56b of the mask 28a. The cylindrical wall 56b is intended to bear against the cylindrical surface 37a of the centering device 24, as also seen in FIG. 10.

The distal end of the mask 28a is shaped to conform to an annular wall 18a of the manifold 18 and is connected to the cylindrical wall 56b by a line or fold 56c of the mask 28a. The word line or fold also covers the case where the mask is not obtained by stamping. This fold 56c is intended to be located at the radially inner end of the port 20a, 20b, at its junction with the manifold 18.

FIGS. 9a and 10 show that the distal end of the mask comprises a substantially flat wall 56d which is intended to be pressed against the annular wall 18a. This wall 56d is connected to a lower rim 56e which is itself intended to be pressed against the wall 14. In practice, there may be a slight clearance to accommodate the manufacturing tolerance range. The wall 56d is further connected to stiffening side rims 56f.

The critical zone of the casing 12 and in particular of the manifold 18 is located at the level of its ports 20a, 20b and in particular their junction with the rest of the manifold. This zone Z is designated in FIG. 10 by a dotted circle. It is indeed in this zone Z that cracks or fissures are likely to appear, which may reduce the service life of the casing 12.

The mask 28a therefore comprises a window 30 for endoscopic inspection of this zone Z. In other words, an endoscopic inspection means, such as an endoscope 60, is engaged by an operator within the port 20a, 20b, passing through the ring 37 so that the distal end of the endoscope 60 is located at the window 30. The endoscope 60 may be used to perform penetrant testing operations in the zone Z and comprises an optical system for viewing this zone Z.

The mask 28a is first engaged in the port 20a, 20b by passing through the ring 37. Its wall 56a is applied to the radial surface 37b of the ring 37. To do this, the pin 48 of the centering device must be engaged in the slot 58 of the centering device. The mask is then moved over the surface 37b so that the pin 48 is engaged in a longitudinal end of the slot 58. This allows the wall 56b of the mask to come to bear against the surface 37a of the centering device. In this position, the mask is in its final position and its wall 56d and its rim 56e should be correctly positioned in the cavity 21. The mask can then be immobilised in this position by screwing the elements 54 into the holes 50 of the centering device 24.

The invention proposes to combine several masks 28a, 28b, 28c with a single centering device 24, thus forming a kit that can be stored in a carrying case. The centering device 24 is then universal and allows the same reference position to be defined for the masks. Each mask is chosen according to the zone to be inspected or the progress of the inspection.

In the example shown, the three masks are used successively during the same inspection operation.

The first mask 28a in FIG. 9a is used first and has a large window 30 which extends substantially across the entire extent of the wall 56d, between the rim 56e and the fold 56c, and between the rims 56f. This window 30 can be used to project penetrant products onto the zone Z by means of the endoscope 60.

The mask 28b of FIG. 9b is used as a second mask, after disassembly and removal of the mask 28a, and comprises a smaller window 30', located at the fold 56c.

The mask 28c in FIG. 9c is used last, after disassembly and removal of the mask 28b, and comprises an even smaller window 30" located at the fold 56c.

The windows 30', 30" are used to view the zone through the endoscope 60. The window 30' may be used to locate an intermediate zone for locating any defects, and the window 30" may be used to locate a critical zone for locating such defects.

Each tool or kit may be specific to the inspection of a port as the ports 20a, 20b may differ from each other in shape and dimension. The inspection of the ports 20a, 20b would then require two kits each comprising a centering device and at least three masks or a single kit comprising a first centering device and at least three masks, and a second centering device and at least three further masks.

The invention claimed is:

1. A positioning tool for an endoscopic inspection means for inspecting a manifold casing of an aircraft turbine engine, the manifold casing comprising an annular wall with an axis of revolution, the manifold casing further comprising through orifices and being surrounded by an annular manifold comprising at least one gas passage port opening into an annular cavity delimited between the manifold and said wall, wherein the tool comprises:
   a centering device configured to be engaged in said port along an engagement direction, said centering device comprising:
   a distal end comprising a bearing pad configured to bear against said wall in said engagement direction in such a way that the bearing forces are perpendicular to a lower surface of the bearing pad, and
   a proximal end configured to be held securely on an opening of said port, and
   at least one mask configured to be engaged in said port and to be positioned and fastened on the proximal end of said centering device, the mask comprising a window for endoscopic inspection of a zone to be inspected inside said port and/or said cavity, and
   wherein the mask further comprises a distal end comprising at least:
   a wall which is substantially flat and configured to be pressed against an annular wall of the annular manifold;
   a lower rim which is connected to the flat wall and configured to be pressed against the wall of the manifold casing, the lower rim being substantially perpendicular to the flat wall and aligned with the bearing pad on the wall of the manifold casing.

2. The tool according to claim 1, wherein said centering device further comprises a ring at the proximal end, the ring being configured to fasten to the opening of the port.

3. The tool according to claim 2, wherein the centering device comprises at least one rod configured to connect together the bearing pad and the ring.

4. The tool according to claim 2, wherein the ring comprises at least one surface to bear against and to position the mask.

5. The tool according to claim 2, wherein the ring comprises at least one guide pin configured to cooperate with at least one of a hole and a slot of the mask.

6. The tool according to claim 5, wherein the ring further comprises an internal cylindrical surface and a radial surface configured to bear against and position the mask.

7. The tool according to claim 1, wherein the mask carries elements that fasten to the centering device.

8. The tool according to claim 1, further comprising at least two masks, each of which is configured to be successively engaged in the port and which have windows of different dimensions and/or positions.

9. A method of endoscopic inspection of a manifold casing of an aircraft turbine engine, this manifold casing comprising an annular wall having through orifices and being surrounded by an annular manifold that comprises at least one port for the gas passage opening into an annular cavity delimited between the manifold and said wall, the method being implemented by a tool according to claim 1 and comprising the steps of :
engaging the centering device of the tool in said port along an engagement direction and bringing the bearing pad of the distal end to bear against said wall in said engagement direction,
fastening the proximal end of the centering device to the opening of the port,
engaging the mask in the port and fastening the mask to the centering device, and
endoscopically inspecting said zone through the window of the mask.

10. The method according to claim 9, further comprising the steps of:
disassembling and removing the mask;
engaging another mask in the port and fastening that other mask to the centering device; and
endoscopically inspecting said zone through the window of said other mask.

11. The tool according claim 1, wherein the mask and the centering device are configured in such a way that, after positioning and fastening the mask on the proximal end of the centering device, the body of the mask and at least one rod of the centering device delimit an insertion zone for the endoscopic inspection.

12. The tool according to claim 1, wherein the low rim is located below the window of the mask.

13. A positioning tool for an endoscopic inspection means for inspecting a manifold casing of an aircraft turbine engine, the manifold casing comprising an annular wall with an axis of revolution, the manifold casing further comprising through orifices and being surrounded by an annular manifold comprising at least one gas passage port opening into an annular cavity delimited between the manifold and said wall, wherein the tool comprises:
a centering device configured to be engaged in said port and comprising:
a distal end comprising a bearing pad configured to bear against said wall in the direction of engagement of the centering device in the port in such a way that the bearing forces are perpendicular to a lower surface of the bearing pad, and
a proximal end comprising a ring configured to be held securely on an opening of said port, and
at least one mask configured to be engaged in said port and to be positioned and fastened on the proximal end of said centering device, the mask comprising a window for endoscopic inspection of a zone to be inspected inside said port and/or said cavity,
the centering device further comprising at least one rod configured to connect together the bearing pad and the ring; and
wherein the mask further comprises a distal end comprising at least:
a wall which is substantially flat and configured to be pressed against an annular wall of the annular manifold;
a lower rim which is connected to the flat wall and configured to be pressed against the wall of the manifold casing, the lower rim being substantially perpendicular to the flat wall and aligned with the bearing pad on the wall of the manifold casing.

14. A positioning tool for an endoscopic inspection means for inspecting a manifold casing of an aircraft turbine engine, the manifold casing comprising an annular wall with an axis of revolution, the manifold casing further comprising through orifices and being surrounded by an annular manifold comprising at least one gas passage port opening into an annular cavity delimited between the manifold and said wall, wherein the tool comprises:
a centering device configured to be engaged in said port and comprising:
a distal end comprising a bearing pad configured to bear against said wall in the direction of engagement of the centering device in the port, and
a proximal end comprising a ring configured to be held securely on an opening of said port, and
at least one mask configured to be engaged in said port and to be positioned and fastened on the proximal end of said centering device, the mask comprising a window for endoscopic inspection of a zone to be inspected inside said port and/or said cavity, said port being inclined with respect to a radius to the axis of revolution of the wall,
the centering device further comprising a first rod and a second rod which are bent according an angle and configured to connect together the bearing pad and the ring, each rod comprising longitudinal portions bent with respect to each other and including a first portion extending from the pad and its surface radially outwards, according to a normal to the wall of the manifold casing, and a second portion extending between the radially outer end of the portion and the proximal end of the centering device, the first and second portions of the first rod being respectively parallel to the first and second portions of the second rod.

* * * * *